United States Patent [19]

Alger

[11] Patent Number: 4,730,458

[45] Date of Patent: Mar. 15, 1988

[54] THERMAL ELECTRIC VAPOR TRAP ARRANGEMENT AND METHOD

[75] Inventor: Terry Alger, Tracy, Calif.

[73] Assignee: The United States of America as represented by the United States Department of Energy, Washington, D.C.

[21] Appl. No.: 911,943

[22] Filed: Sep. 26, 1986

[51] Int. Cl.⁴ .............................................. F25B 21/02
[52] U.S. Cl. .............................................. 62/3
[58] Field of Search .............................................. 62/3

[56] References Cited

U.S. PATENT DOCUMENTS

| | | | |
|---|---|---|---|
| 3,212,274 | 10/1965 | Eidus | 62/3 |
| 3,238,944 | 3/1966 | Hirschhorn | 62/3 X |
| 4,315,599 | 2/1982 | Biancardi | 62/3 X |
| 4,400,948 | 8/1983 | Moorehead | 62/3 |
| 4,499,736 | 2/1985 | Lieu et al. | 62/3 |
| 4,506,510 | 3/1985 | Tircot | 62/3 |

Primary Examiner—Lloyd L. King
Attorney, Agent, or Firm—L. E. Carnahan; P. Martin Simpson, Jr.; Judson R. Hightower

[57] ABSTRACT

A technique for trapping vapor within a section of a tube is disclosed herein. This technique utilizes a conventional, readily providable thermal electric device having a hot side and a cold side and means for powering the device to accomplish this. The cold side of this device is positioned sufficiently close to a predetermined section of the tube and is made sufficiently cold so that any condensable vapor passing through the predetermined tube section is condensed and trapped, preferably within the predetermined tube section itself.

1 Claim, 4 Drawing Figures 4,730,458

THERMAL ELECTRIC VAPOR TRAP ARRANGEMENT AND METHOD

FIELD OF THE INVENTION

The U.S. Government has rights in this invention pursuant to Contract No. W-7405-ENG-48 between the U.S. Department of Energy and the University of California for the operation of the Lawrence Livermore National Laboratory.

BACKGROUND OF THE INVENTION

The present invention relates generally to the collection of vapors passing through a tube and more particularly to a specific technique for trapping condensable vapors by condensing the latter within a specific section of the tube.

Thermal electric devices are well-known in the art. One such device may be purchased from Melcor under model no. CP5-31-10L. This type of particular device includes a hot side and opposite cold side (actually planar faces). When electrically powered by a suitable source of electricity, the hot side increases in temperature from, for example, room temperature and its cold side decreases in temperature. The exact changes in temperature will depend upon the rating of the particular device. Devices of this general type can be operated in series so that the cold side can be made to operate at very low temperatures, depending upon the power dissipation requirements.

Thermal electric devices of the type described are typically used, for example, for the purpose of cooling electronics devices. As will be seen hereinafter, applicant has discovered that the very same device can be utilized as part of a very uncomplicated and yet reliable technique for trapping condensable vapor as the latter passes through a tube.

SUMMARY OF THE INVENTION

It is an object of the present invention to provide an uncomplicated and yet reliable technique for condensing condensable vapor as the latter passes through a section of a tube utilizing a thermal electric device of the general type described above.

A more particular object of the present invention is to trap the vapors so condensed by the thermal electric device in a specific way.

Another particular object of the present invention is to provide a specific way of cooling the hot side of the thermal electric device used in the overall technique, specifically a way which provides for substantially colder cold side temperatures than a given single thermal electric device is normally capable of providing.

As will be seen hereinafter, the technique for condensing and trapping condensable vapor, as disclosed herein, includes a predetermined section of the tube through which the condensable vapor flows, preferably a tube section which is configured so as to define at least a U-shape and most preferably a serpentine-shaped and finned flow path for the vapor. The technique disclosed also includes means including the previously recited thermal electric device such that the cold side of the latter is positioned sufficient close to a predetermined tube section and is sufficiently cold to cause condensable vapor passing through that tube section to condense. At the same time, the technique provides means for cooling the hot side of the device.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
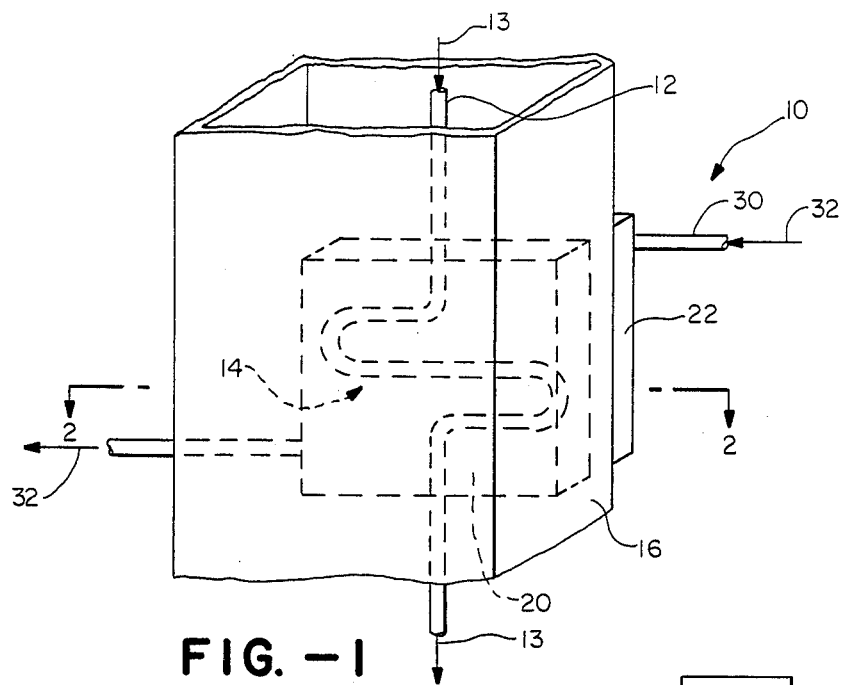
FIG. 1 is a perspective view of an arrangement for condensing and trapping vapor, which arrangement is designed in accordance with the present invention.
Figure 3:
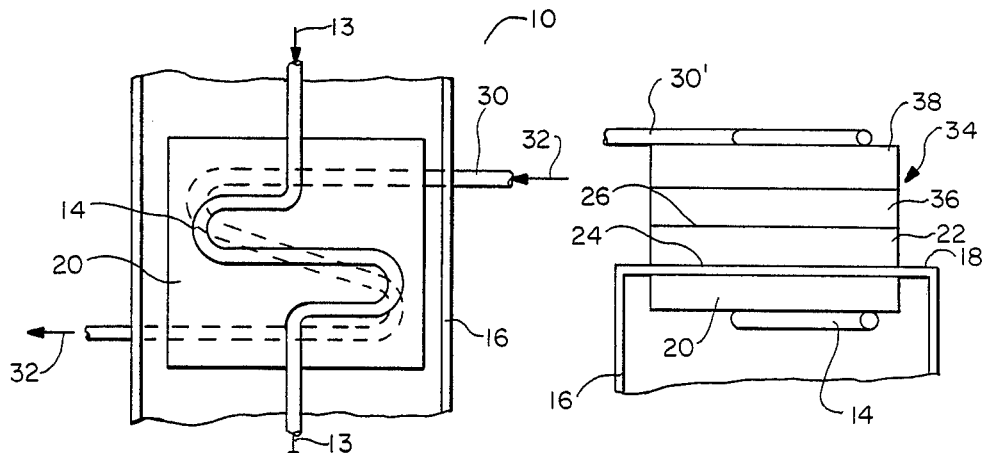
FIG. 3 is a frontal sectional view of the arrangement of FIG. 1, taken generally along lines 3—3 in FIG. 2.

Turning now to the drawings, wherein like components are designated by like reference numerals throughout the various figures, an overall arrangement 10 designed in accordance with the present invention is illustrated. This arrangement is provided for condensing and trapping condensable vapor passing through a tube which is generally indicated at 12. The tube is shown extending in the vertical direction and the flow path for vapors within the tube is downward, is indicated by means of arrows 13. Overall arrangement 10 includes a predetermined section 14 of tube 12. This section is preferably configured so as to define a serpentine path for vapor stream 13, as best illustrated in FIGS. 1 and 3. As will be seen hereinafter, arrangement 10 functions to condense within the tube at section 14 any condensable vapors passing therethrough and the particular shape of the tube section serves to trap the condensate within its confines for eventual removal.

Figure 2:
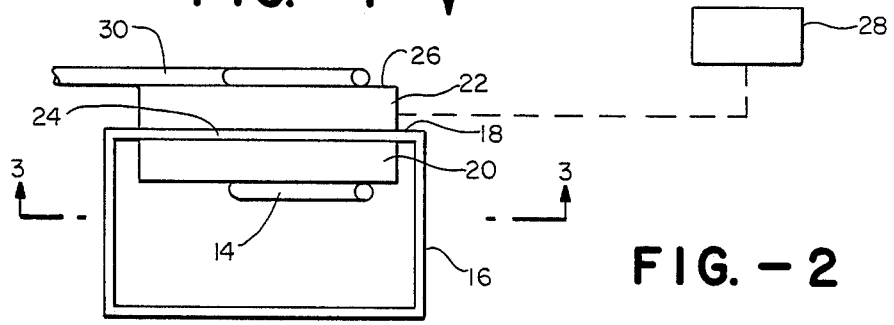
FIG. 2 is a cross-sectional view of the arrangement of FIG. 1, taken generally along lines 2—2 in FIG. 1.

Still referring to FIG. 1 in conjunction with FIGS. 2 and 3, arrangement 10 is shown including a vertically extending housing 16 having at least one planar side wall 18 constructed of a thermally conductive material, for example, a metal. A lengthwise segment of tube 12 including all of section 14 is contained within housing 16 along with a support plate 20 which is also constructed of a highly thermally conductive material, for example, copper or aluminum. Plate member 20 is brazed or otherwise suitably connected on one side thereof directly to the internal surface of housing side wall 18 while section 14 of tube 12 is welded or otherwise suitably connected directly to side wall 18 opposite plate 20. In this way and for reasons to be discussed below, there is a highly thermally conductive path defined between the outer surface of side wall 18 and tube section 14.

In accordance with one aspect of the present invention, overall arrangement 10 includes a thermal electric device of the general type described above. This device which is generally indicated at 22 in FIGS. 1 and 2 includes a cold side 24 and an opposite hot side 26. The thermal electric device is powered by a suitable source of electricity generally indicated at 28. In an actual working embodiment, device 22 is of the specific type recited above, that is, one purchased from Melcor under the model no. CP5-31-10L and electric source 28 is a DC power supply. This particular device can be operated so that its cold side 24 drops substantially from room temperature, while its hot side, unless externally cooled, will rise in temperature.

Still referring to FIGS. 1 and 2, thermal electric device 22 is supported by any suitable means so that its cold side 24 rests directly against the outer surface of housing side wall 18 in direct alignment with plate member 20. In this way, the cold side of the thermal electric device serves to cool side wall 18, plate member 20 and eventually tube section 14. These various components are selected so that tube 14 is cooled sufficient to condense the condensable vapors passing through the tube section. A contemplated type of vapor is water vapor which freezes into a solid from its vapor state at a temperature of approximately 32° F. at atmospheric pressure. Therefore, the thermal electric device must be designed to accomplish this. Once the vapor condenses, the condensate tends to remain trapped within tube section 14 as a result of its particular serpentine configuration, although the tube section 14 could be designed to include other configurations capable of trapping the condensate or the latter may be allowed to move through the tube in liquid phase where it is trapped at a remote location. In either case, suitable means (not shown) may be provided for removing condensate after a sufficient amount has accumulated. For example, tube section 14 could be made readily removable from the rest of the tube or it could include some form of trap door or removable plug.

In order to operate the thermal electric device continuously over long periods and/or in order to prevent the ambient surroundings from overheating (which may be important under certain circumstances), overall arrangement 10 includes suitable means for continuously cooling the hot side 26 of device 22. In the particular embodiment illustrated the means utilized includes a cooling tube generally indicated at 30 having a section positioned directly against hot side 22 by suitable means not shown. A suitable cooling medium including but not limited to water, indicated generally by means of arrows 32, is caused to pass through the cooling tube. While not shown, the cooling tube may be connected to some form of heat exchanger to transfer the heat taken by the cooling medium from the hot side of the thermal electric device.

While overall arrangement 10 has been described for condensing the condensable vapor within the tube generally, it is especially suitable for use in small vacuum assemblies in particular.

Figure 4:
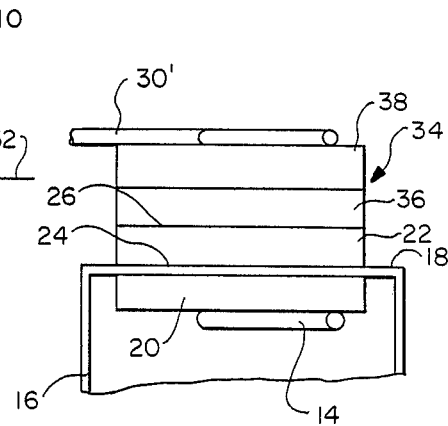
FIG. 4 illustrates a modification of the arrangement of FIGS. 1-3.

Arrangement 10 has been described as including a cooling tube for cooling the hot side 26 of thermal electric device 22. FIG. 4 illustrates a modified assembly 34 for providing the same function with additional advantages. Apart from this assembly which will be described immediately below, the rest of the components illustrated in FIG. 4 correspond identically to those of arrangement 10 illustrated in FIGS. 1-3. These identical components shown in FIG. 4 include tube section 14, plate member 20, housing 16 and thermal device 22.

Still referring to FIG. 4, cooling assembly 34 includes a plurality of stacked (in series and/or parallel) thermal electric devices, as exemplified by two such devices 36 and 38. Each of these devices is generally of the type described above including a cold side, a hot side and a suitable source of electric power. Thermal electric device 36 is suitably supported by means not shown so that its cold side is positioned directly against the hot side of thermal electric device 22. At the same time, thermal electric device 38 is suitably supported by means not shown so that its cold side is positioned directly against the hot side of thermal electric device 36. In this way, device 36 serves to cool the hot side of device 22 and device 38 serves to cool the hot side of device 36.

Additional thermal electric devices can be used in this stacked array. However, in a preferred embodiment, the hot side of the last or topmost thermal electric device is cooled in the same manner as hot side 26 of device 22 forming part of embodiment 10, that is, by means of a cooling sleeve. In FIG. 4, the cooling sleeve 30' through which suitable cooling fluid passes is provided for this purpose. An advantage to assembly 34 is that the overall stacked array of thermal electric devices can be provided to cool tube section 14 to a greater degree than would be possible with a single, presently available type of thermal elelctric device. Where the vapor being condensed is freezable, assembly 34 (or even assembly 10) can be designed to actually freeze the resultant condensate.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An arrangement for trapping condensable vapor passing through a condensing tube, said arrangement comprising: a predetermined section of said condensing tube configured so as to define at least a U-shaped flow path therethrough; a thermally conductive plate member having opposing faces, one of which is positioned directly against said predetermined tube section; a housing for containing said predetermined condensing tube section and plate member, said housing including at least one side wall formed of thermally conductive material and having an internal surface positioned directly against the face of said plate member opposite said predetermined condensing tube section; thermal electric means including a plurality of thermal electric device, said thermal electric means having a hot side and a cold side, the latter being positioned against the outer surface of said side wall in direct alignment with said plate member, said cold side of said thermal electric device being sufficiently cold to condense any vapor passing through said tube section, whereby the condensed vapor becomes trapped within said tube section; a cooling tube disposed directly against the hot side of said thermal electric means for cooling the thermal electric means; means for directing cooling fluid through said cooling tube; and wherein said plurality of thermal electric devices each have a hot side and a cold side, the thermal electric devices being stacked in serial arrangement such that the cold side of a given device cools the hot side of the device directly under it, except for the innermost thermal electric device which has a cold side that cools said predetermined tube section, and the outermost thermal electric device which has a hot side that is cooled by said cooling means.

* * * * *